July 3, 1956 W. ELFENBEIN 2,753,121
WASTE MACERATER
Filed Sept. 10, 1953
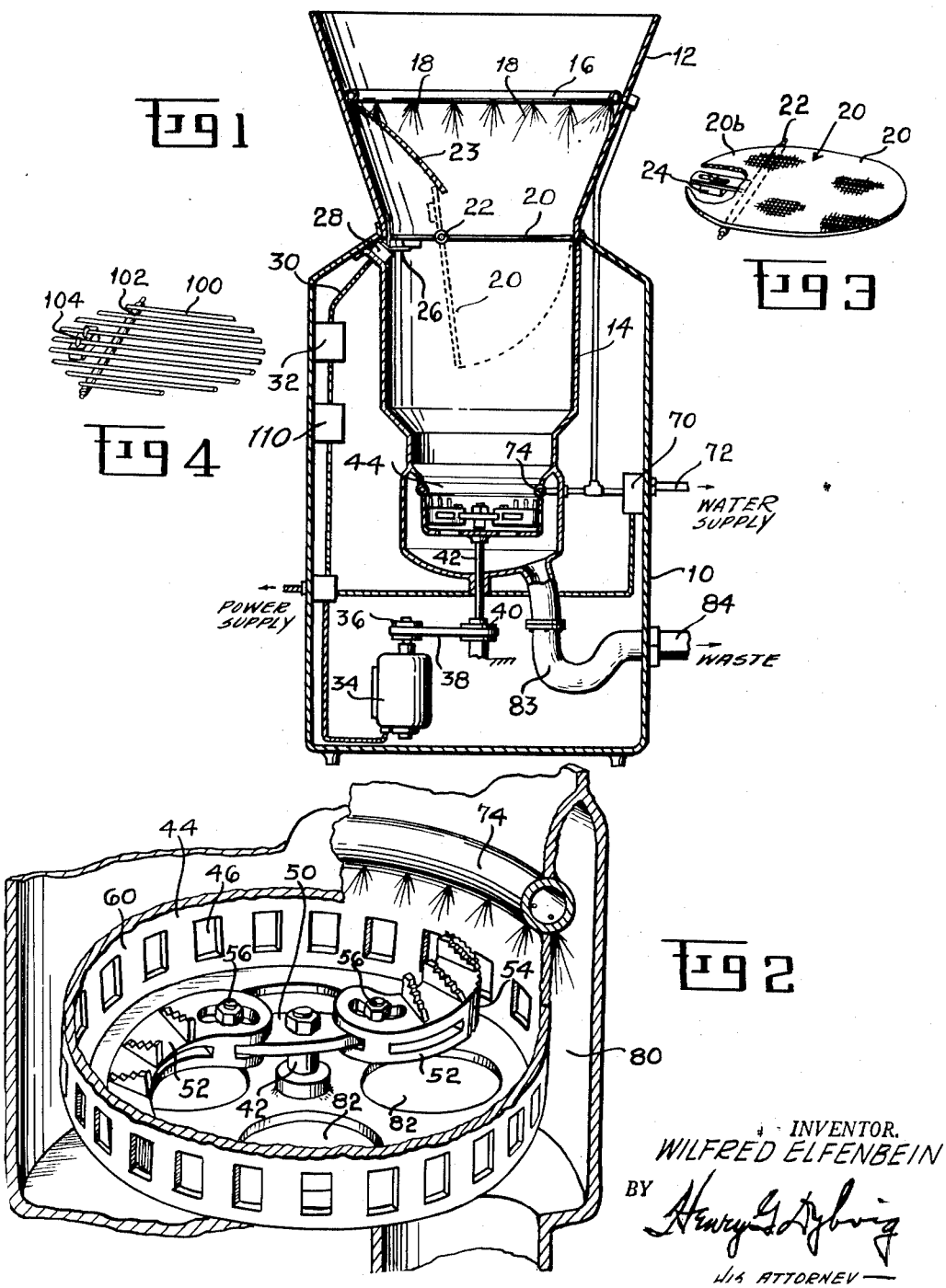
INVENTOR.
WILFRED ELFENBEIN
BY
HIS ATTORNEY

United States Patent Office 2,753,121
Patented July 3, 1956

2,753,121

WASTE MACERATER

Wilfred Elfenbein, Dayton, Ohio

Application September 10, 1953, Serial No. 379,445

6 Claims. (Cl. 241—32.5)

This invention relates to a macerater and more particularly to a macerater for use in disposing of paper towels, napkins and other articles made from paper or some similar material, although not necessarily so limited.

In public places where paper towels are used, there is a problem of providing adequate waste cans or containers for the disposal of paper towels, et cetera. Furthermore, the use of containers for storage presents a labor problem and is both expensive and inefficient.

An object of this invention is to provide a macerater for use in disposing of paper articles and the like, wherein the paper, together with water, is supplied to a macerater that chews up the paper while wet and washes the macerated paper out of the macerater into a drain pipe, which may consist of a drain pipe connected to a sewer or draining into any other suitable channel.

Another object of this invention is to provide a macerater for waste paper and the like that operates periodically and cyclically and that in the meantime is inoperative and provides a suitable storage place for the accumulation of the waste paper, sanitary napkins, et cetera, until a sufficient quantity is accumulated or until a predetermined time interval has elapsed, at which time the waste paper is wetted and fed into the macerater, from whence it is washed into any suitable channel.

Another object of this invention is to provide a hopper for the storage of waste paper, which hopper is provided with a trap door in the bottom thereof that is so placed that upon a predetermined weight of waste paper being deposited into the hopper, the trap door opens to dump the paper and simultaneously therewith water is added to the waste paper to wash the same down into a macerater.

Other objects and advantages reside in the construction of parts, the combination thereof and the mode of operation, as will become more apparent from the following description.

In the drawings, Figure 1 discloses a vertical cross sectional view of a macerater and parts associated therewith.

Figure 2 is a fragmentary, enlarged, perspective view of the macerater per se, together with parts associated therewith.

Figure 3 is a perspective view of the trap door shown in Figure 1 to illustrate the details of the structure thereof, together with the mechanism used in adjusting the balanced weight used in holding the trap door in closed position until a predetermined quantity of paper has been deposited on the trap door.

Figure 4 discloses a modified trap door, wherein a plurality of rods or tines are used as a trap door, these rods or tines being pivotally supported so as to open the trap door when a predetermined quantity of waste paper is located on top of the trap door.

Referring to the drawings, the reference numeral 10 indicates a casing forming the main body of the macerater and the parts associated therewith. This casing terminates in a reentrant reduced portion having mounted therein a hopper 12 merging into a cylindrical portion 14 forming an inner casing, the bottom of which provides a support for the macerater, as well be explained more fully later. The hopper portion 12 tapers from top to bottom and is provided with an annular spray pipe or spray ring 16, surrounding the outer wall of the hopper, this spray pipe 16 being provided with a plurality of spray openings providing sprays 18 that are supplied to the paper that may accumulate in the hopper.

The bottom of the hopper is provided with a pivotally mounted trap door 20, having a transverse rod 22 pivotally mounted in the margins of the hopper, the rod 22 being located to one side, so that whenever paper is put into the hopper the greater portion of the paper is supported upon the larger portion 20a of the trap door 20. Underlying the smaller sector 20b of the trap door 20 is a weight 24 that is adjustably mounted, so as to provide a counterbalance, holding the trap door normally in a horizontal position, as shown in Figure 1. This weight may be adjusted toward or away from the supporting rod 22, so that the trap door 20 will support a predetermined weight of paper before it releases. A shield or guard 23 overlies the smaller sector 20b, so as to prevent the waste material from interfering with the operation of the trap door 20.

The weight 24, when the trap door is in a horizontal position, engages a lever 26 controlling a switch 28. As soon as the weight 24 moves away from the switch lever 26, the switch lever 26 closes the switch in an electric circuit represented by the cable 30, so as to energize a timing mechanism 32. This timing mechanism, when the switch 28 is closed, energizes a motor 34 provided with a V-belt pulley 36 driving a V-belt 38, propelling a V-belt pulley 40 mounted upon a shaft 42 journalled in suitable bearings and having the upper end thereof projecting into the macerater compartment 44. The motor shaft could be coupled directly to the shaft 42, thereby eliminating the V-belt and the pulleys.

The macerater compartment 44 is provided with a plurality of circumferentially disposed apertures 46. The upper end of the shaft 42 supports an arm or link 50, having pivotally mounted thereto a pair of arcuate hammers 52, which are preferably provided with an arcuate serrated or toothed margin 54, so that as the shaft 42 is rotated, the hammers 52 will swing outwardly about the pivot 56 by centrifugal force, so as to intermittently engage the portions 60 positioned between the apertures 46. At the same time that the switch 28 is closed, an electromagnetic valve 70 is energized, so as to open the valve that is connected to a water pipe 72, so as to force water through the spray ring 16 and through a spray ring 74, supplying a spray of water to the paper in the hopper 12 and continuing to supply water to the macerater mechanism. The spray ring 74 supplies a spray of water to the inside of the cavity or compartment 44 and to the compartment channel 80 surrounding the cavity 44. The bottom of the cavity 44 is provided with a plurality of openings 82 that permit the macerated paper to be drained out through these openings. The bottom of the compartment channel 80 drains into a waste pipe 83, which might be a gooseneck or a sewer drain, and drains outwardly through a pipe 84 connected to a sewer, or empties into any other suitable channel for the disposal of the macerated paper.

The timing mechanism 32 is so arranged that after the trap door 20 swings downwardly and then again into closed position, the motor and the macerater are operated and a spray is supplied to the device for a period of time sufficient to completely macerate the charge of paper and wash this out of the macerater. This operation continues after the trap door 20 moves into closed or horizontal position. The timing mechanism automatically closes at the end of a predetermined period. This may be adjusted to meet the particular requirements.

Furthermore, the timing mechanism may be provided with a clock mechanism 110 that automatically closes the circuit, so as to energize the macerater motor 34 and so as to open the electromagnetic valve 70 to wet any paper or other foreign matter that may accumulate upon the trap door 20, the weight of the paper upon being wetted being sufficient to trip the trap door, so as to dump any paper or other matter that may have been thrown into the hopper during the intervening period of time. For example, if waste material such as sanitary napkins, over-ripe fruit or the like are thrown into the hopper, if the timing mechanism did not energize the macerater equipment, this foreign matter might readily become a nuisance, due to foul odors and the like. Whether or not the device operates cyclically at the expiration of predetermined periods or intervals of time depends entirely upon the place and nature of the use of the macerater. In the event the waste material dumped into the hopper becomes a nuisance if it is not disposed of at the predetermined period of time, a timing mechanism should be selected that automatically operates the macerater at predetermined intervals of time. On the other hand, if the macerater is to be used where there is no danger of the waste material becoming a nuisance, it is then unnecessary to use a timing mechanism which energizes the macerater at predetermined intervals of time, in that the tripping of the trap door may be the sole means of energizing the macerater.

In Figure 3 the trap door has been shown as consisting of a porous screen-like member that may be made from woven wire or it may be made from perforated sheet metal. For some installations it may be desirable to provide a trap door wherein the supporting members are all parallel and vertically disposed when the trap door has been tripped, as shown in Figure 4. In this modification a plurality of rods 100, spot welded or otherwise secured to a transverse rod 102, forms the trap door. A weight 104 is adjustably mounted on the short end of some of the rods, so as to provide the necessary counterbalance.

The hammermill has been shown as illustrative of hammermills of various makes and shapes.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A macerater for use in disposing of waste paper and the like including a hopper, a trap door in the bottom of the hopper, said trap door tripping upon a weight being applied thereto, a spray ring surrounding the hopper adapted to spray water upon the contents in the hopper, a hammermill underlying the trap door, a switch responsive to movement of the trap door, a timing mechanism responsive to actuation of the switch, said timing mechanism energizing the hammermill, and an electromagnetic valve connected into a water main connected to the spray ring; said timing mechanism energizing the electromagnetic valve so as to supply a spray of water to the material to be macerated, said spray of water continuing to operate until the timing mechanism interrupts the operation of the hammermill and closes the electromagnetic valve.

2. A macerator assembly for use in disposing of waste paper and the like including a hopper, a trap door in the bottom of the hopper, said trap door tripping upon a predetermined weight being applied thereto, a switch responsive to movement of the trap door, means underlying the trap door for macerating the contents of the hopper when the trap door is tripped, a timing mechanism responsive to actuation of the switch, said timing mechanism energizing the macerating means, a spray adapted to spray water upon the contents of the hopper, and an electromagnetic valve connected into the water main connected to the spray, said timing mechanism energizing said electromagnetic valve so as to supply a spray of water to the material to be macerated, said spray of water continuing to operate until the timing mechanism interrupts the macerating means and closes the electromagnetic valve.

3. A macerator assembly according to claim 2, wherein the trap door is provided with openings for the passage of water.

4. A macerator assembly according to claim 2, wherein the trap door consists of a plurality of parallel rods spaced apart from each other so as to form openings between the rods, said rods when the trap door is in closed position extending substantially across the bottom of the hopper.

5. A macerator assembly according to claim 2, wherein a spray ring is mounted above the macerator means and below the trap door, said spray means supplying an additional spray of water to the macerator means during the operation thereof.

6. A macerator assembly according to claim 2, wherein the timing mechanism includes mechanism for operating the spray and the macerating means periodically.

References Cited in the file of this patent

UNITED STATES PATENTS

| | | |
|---|---|---|
| 1,005,075 | Rosenstock | Oct. 3, 1911 |
| 2,676,759 | Strehlow | Apr. 27, 1954 |